US006538689B1

(12) United States Patent
Chang

(10) Patent No.: US 6,538,689 B1
(45) Date of Patent: Mar. 25, 2003

(54) MULTI-RESIDENCE MONITORING USING CENTRALIZED IMAGE CONTENT PROCESSING

(76) Inventor: Yu Wen Chang, 1925 McKinley Ave., Suite F, La Verne, CA (US) 91750

( * ) Notice: Subject to any disclaimer, the term of this patent is extended or adjusted under 35 U.S.C. 154(b) by 0 days.

(21) Appl. No.: 09/179,339

(22) Filed: Oct. 26, 1998

(51) Int. Cl.$^7$ .................................................. H04N 7/18
(52) U.S. Cl. ....................................................... 348/159
(58) Field of Search ................................. 348/159, 152, 348/153, 154, 155; 340/534, 506, 531, 105, 108; 396/56, 59; H04N 7/18

(56) References Cited

U.S. PATENT DOCUMENTS

| 4,511,886 A | * | 4/1985 | Rodriguez | 340/534 |
| 4,777,526 A | * | 10/1988 | Saitoh et al. | 348/159 |
| 5,144,661 A | * | 9/1992 | Shamosh et al. | 348/143 |
| 5,202,759 A | * | 4/1993 | Laycock | 348/152 |
| 5,412,708 A | | 5/1995 | Katz | |
| 5,441,047 A | | 8/1995 | David et al. | |
| 5,541,703 A | * | 7/1996 | Suzuka | 396/56 |
| 5,956,424 A | * | 9/1999 | Wootten et al. | 348/154 |
| 6,097,429 A | * | 8/2000 | Seely et al. | 348/159 |

OTHER PUBLICATIONS

ADPRO®, Data Sheets downloaded from Internet on Jul. 1, 1998. All pages are pertinent.

* cited by examiner

*Primary Examiner*—Nhon Diep
(74) *Attorney, Agent, or Firm*—Rutan & Tucker, LLP; Robert D. Fish

(57) ABSTRACT

Improved multi-residence security systems combine distributed cameras with centralized image content processing and interactive monitoring. This particular combination improves cost-effectiveness by increasing the number of residences or other sites that a single operator can monitor, and by providing the operator with the ability to remotely communicate with an intruder.

15 Claims, 1 Drawing Sheet

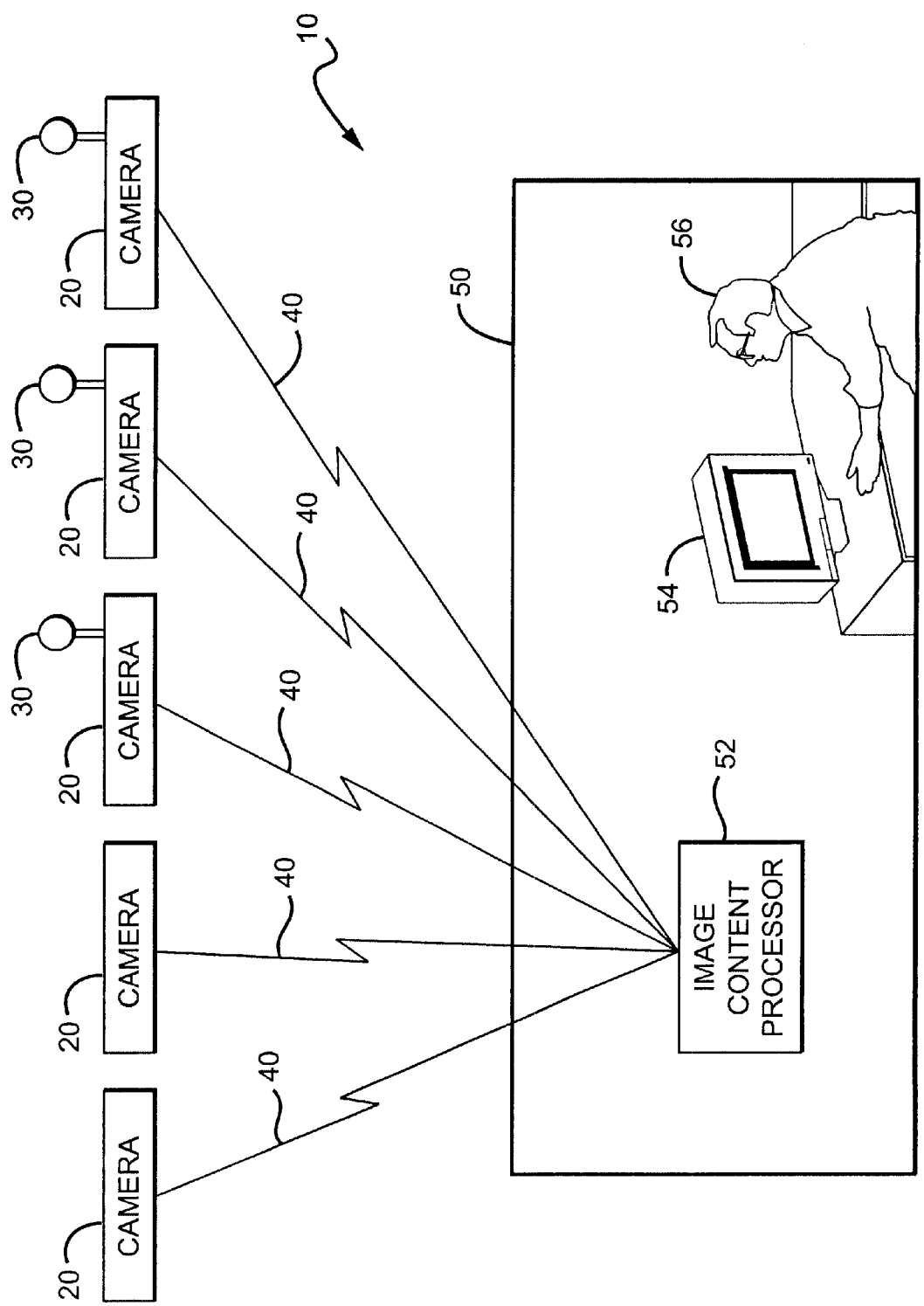

MULTI-RESIDENCE MONITORING USING CENTRALIZED IMAGE CONTENT PROCESSING

FIELD OF THE INVENTION

The field of the invention is home security systems.

BACKGROUND OF THE INVENTION

Incidents of theft and violence occurring within or near residences are all too common occurrences, resulting in a continuing need to provide effective security systems. Although there are many security systems available on the market, most of the high end, sophisticated systems are designed for either commercial use or for use by persons having large homes and/or high incomes.

One especially difficult problem is poor cost effectiveness in the protection of ordinary residences. Cost considerations, for example, generally limit the availability of full-time video monitoring of residences to wealthy individuals. Although methods are known for providing security that do not involve full-time monitoring, such methods tend to be unreliable. Among other things, unattended or partially unattended systems tend to generate a large number of false alarms, and thus tend to be ignored when a true alarm is sounded.

To be affordable to ordinary residents, protection systems would ideally have both a relatively low initial cost and a relatively low, ongoing monitoring cost. In many instances the market ceiling may be about $100.00 per month, and in some markets the ceiling may be only about $50.00 per month (in Jan. 1, 1998 dollars), or even less. Labor costs generally prevent presently known systems from achieving that result. In the United States, for example, a $50 monthly charge per residence would generally only pay for a single operator to monitor a single cameras at each of 75 residences for an average of less than two hours per view per day. Of course, if an average residence had more than one camera, such as one for the front of the residence and one for the back, the average period that each camera can be monitored drops to less than one hour per day. This leaves over 90% of the day unattended, and is completely inadequate. Thus, without some sort of automatic interrupt or automatic prioritizing of images, it is contemplated that a single operator can realistically only monitor about ten to twenty cameras. Such monitoring is generally not cost-effective.

One possible solution to the cost-effectiveness problem is to utilize motion detectors that only send images to a centralized monitoring facility when motion is detected. Unfortunately, such technology tends to be problematic in residential environments due to a relatively high frequency of activity in and around residences, such as from pets and children. Remote image content processing (i.e., image content processing that is located at or near each camera rather than in a centralized monitoring facility or transmission node) is also known, and is sold, for example, by ADPRO™ Vision Systems, Mawson Lakes SA 5095, Australia. Unfortunately, while remote image content processing can reduce the number of false alarms sent to a central monitoring facility below that provided by simple motion detectors, remote image content processing is relatively expensive to install and maintain because of the distributed nature of the technology. Still further, as software and hardware advances, each remote image content processing capability must be individually updated to stay current.

Another possible solution is to initiate a transmission link to the monitoring facility only upon demand. The demand may be generated by a user connecting his system for full-time surveillance only during high risk periods, or by a remote processor identifying an urgency (perhaps using remote image content processing), and then dialing into the central monitoring facility. In U.S. Pat. No. 5,412,708 to Katz (May 1995), for example, a security system includes a plurality of cameras coupled to a central monitoring facility via dial up-telephone lines. A computer presents images from the cameras on a random basis or using a predetermined sequence, such that a relatively large number of cameras can be accommodated. Similar systems have been proposed for medical observation of home-bound patients. (See U.S. Pat. No. 5,441,047 to David et al. (Aug. 1995)). While these systems improve cost effectiveness on a per user basis, they do so at the cost of extensive "dark" periods. Katz, for example, teaches that each view may be observed for perhaps only one thirty second interval every ten minutes.

In addition to monitoring problems, security systems have responsiveness problems. For example, if an operator observes an intruder on a monitor in a typical security system, there is a high probability that the intruder will achieve his goals and leave the scene of the crime before police or security personnel arrive at the scene. This problem is especially acute with respect to residential areas because of their relatively great geographic dispersion.

The responsiveness problem has been addressed to some extent by providing two-way communication between remote sites and the central monitoring facility. The David et al. '047 patent, for example, describes security systems that employ interactive cable television to provide two-way communication between a medical worker and a patient. Applying that concept to residence monitoring, an operator may advantageously deter an intruder by informing the intruder that he is being watched, and that the appropriate authorities have been notified. Unfortunately, such operator intervention will only be effective if an operator happens to be actively monitoring a view showing the intrusion. In the past such detection requires either a large number of operators relative to the number of cameras (views) being monitored, or relatively sophisticated equipment at the remote locations for filtering out non-emergency situations.

Thus, providing security systems presents both monitoring and responsiveness problems that have not heretofore been cost-effectively resolved, especially in the residential market at large. This situation has resulted in a continuing need to improve methods and apparatus for residential security.

SUMMARY OF THE INVENTION

According to the present invention, improved security systems combine distributed cameras with centralized image content processing and interactive monitoring. This particular combination improves cost-effectiveness by increasing the number of residences or other sites that a single operator can monitor, and by providing the operator with the ability to remotely communicate with an intruder.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 1 is a schematic of a security system according to the invention.

DETAILED DESCRIPTION

Referring to FIG. 1, a security system 10 generally comprises a plurality of remote cameras 20, remote speakers 30, transmission links 40, a central monitoring facility 50 having an image content processor 52, at least one monitor 54, and at least one human operator 56.

As used herein, the terms "remote" and "central" are employed in a functional sense, rather than a geographical sense, to describe a distributed system. Broad geographical distribution is thus not required, and no particular distance limitations should be implied. On the other hand, it is contemplated that the system will operate with the central monitoring facility at least two or three miles, and in many instances five, ten or more miles from at least one of the remote sites serviced. The terms "remote" and "central" also do not require any particular pattern of geographical distribution. A "central" monitoring facility may actually be at one end of, or even outside of the geographical locale(s) of the remote sites, and may possibly be in another state or even another country from one or more of the remote sites. Still further, the central monitoring facility need not be limited to a single room or even a single building. A central monitoring facility may, for example, have one or more computers connecting transmission lines from the remote cameras 20, and then distribute video feed to two or three monitors in one room and another monitor in another room. A central monitoring facility may even be mobile relative to the remote sites.

Also as used herein, the term "residence" means buildings associated with households. Thus, the term "residences" includes single residence housing, duplexes, dormitories, apartments and the like. Mixed use buildings such as homes containing offices are also considered to be residences as the term is used herein, but office buildings, factories and so forth are generally not considered to be residences. The term "residential property" means residential building(s), as well as any surrounding improved or unimproved land associated with a residence.

Turning in greater detail to FIG. 1, it is contemplated that cameras 20 may comprise any suitable device that repeatedly produces pictorial images that are transmitted electronically. Suitable cameras 20 range from tiny, hidden cameras with fixed fields of view to sophisticated cameras having moveable focus and targeting. Suitable cameras 20 may include black & white or color cameras, statically or dynamically mounted cameras, operator controllable cameras, and even night vision or other special purpose cameras. The camera circuitry may include analog or digital elements. Different types, sizes, qualities and other disparities of cameras may be also varied among and within sites being monitored.

Cameras 20 are preferably placed near or within a residence so that most or all of the points of entry and items of value fall within the field of view of at least one camera. In some instances three, five, or even ten or more cameras may be needed for proper coverage of a single residential property, although in many instances it is contemplated that a relatively small number of cameras, such as one or two, may be satisfactory due to the relatively limited number of points of entry and small area to cover. Cameras 20 may advantageously be arranged to provide overlap in their respective fields of view, although such overlap is not necessary. Cameras 20 may or may not be hidden from intruders.

The remote speakers 30 are generally contemplated to include any suitable means of conveying auditory information to the remote sites. Thus, remote speakers 30 may comprise relatively large loudspeakers for outdoor use, or relatively small speakers for indoor use. The number and placement of speakers may also vary greatly from remote site to remote, site. Thus, in some instances remote speakers 30 may be mounted near one or more of the cameras 20, or even incorporated into the housing of the cameras 20. A single speaker may also be utilized in association with multiple cameras, or multiple speakers may be utilized with a single camera. Remote speakers 20 are preferably placed in prominent view, but in alternative embodiments may be more or less hidden from view.

In preferred embodiments an operator 56 will have his own microphone, which is selectively coupled to the remote speakers 30 so that the operator can "speak through" one or more of such speakers 30. Alternatively, an operator 56 may play a pre-recorded messages through a selected speaker 30, or may play through a, speaker a recording of the intruder's own speech that had been picked up earlier by a remote microphone. Still further, information produced by a remote speaker may be at least partially under the control of someone or something other than the operator. To give a single example, a computer at a central monitoring facility may cause a warning message to be broadcast by a remote speaker with little or no input from an operator. In especially preferred embodiments remote speakers 20 may be associated with, or comprise a microphone (not shown), which would permit two-way conversations between the operator 56 and a person (not shown) physically located at a remote site.

Transmission links 40 informationally couple output from the cameras 20 with the central monitoring facility 50. Transmission links 40 may also informationally couple the speakers 40 with the central monitoring facility 50, although other paths (not shown) may be used for this purpose. It is contemplated to employ any suitable method(s) for such coupling, whether currently known or not, including dedicated hard wire connections, radio waves, phone lines, cable lines, fiber optic lines, and any combination of these. Thus, transmission links 40 may include dial-up or dedicated telephone lines. The transmission links 40 may also be multiplexed, so that multiple cameras might share a single link from the remote site to the central monitoring facility 50. Interfacing for such systems may use time division mode, frequency division mode, or any other suitable methodology.

The central monitoring facility 50 may be more or less elaborate, and more or less sophisticated, depending upon the embodiment. Thus, a simple facility may have only a single operator 56 working only a portion of the day, while a more sophisticated facility may have multiple operators 56 simultaneously working shifts around the clock. Similarly, each operator 56 may have only a single display screen 54 to observe, but more likely each operator 56 would have 2, 3, 4 or even more display screens 54 to observe simultaneously.

The image content processor 52 analyzes video or other pictorial images transmitted across the transmission links 40 from cameras 20. The analysis involves at least some filtering of video images based on image content, so that the number of on-line cameras 20 may considerably exceed the number of on-line monitors 54, while still maintaining a reasonably viable security functionality.

In preferred embodiments the system will employ information from the image content processor 52 to automatically or semi-automatically prioritize images according to preset parameters. Such parameters may involve distinguishing persons from animals, distinguishing scenes which may be expected at various times of the day, determining when large items are being transported, identifying weapons, and so forth. Selected images are then presented to the operator in some manner which alerts the operator the relative priority.

In a particularly preferred embodiment, higher priority images automatically replace lower priority images on a monitor. For example, if the images received from a first camera have been relatively static for several hours, with no evidence of any human forms within the camera's view, a sudden detection of a human form may produce a medium priority, and cause the corresponding images to be presented on one of the operator's screens. In such manner, one or even all of the operator's screens may be occupied by medium priority images at any given time. Nevertheless, if several human forms are detected in images from another camera 20, accompanied by running or other fast motion, or perhaps a loud sound picked up by a nearby microphone, a high priority state may be determined such that a stream of corresponding images are presented on one of the operator's screens in lieu of a medium priority image stream. Fuzzy logic may advantageously be employed to make such decisions.

It should be appreciated that the terms "prioritize" and "prioritizing" are employed broadly herein to include any useful manner of embodying priority. Thus, a system that prioritizes images may cause relatively high priority images to displace relatively low priority images on a monitor. In an alternative embodiment, however, the priority may be demonstrated by signaling the operator with an auditory signal, or a blinking or colored light on or near the monitor. In still further embodiments, priority may be demonstrated by displaying an associated image on a designated "high priority" monitor.

It should also be appreciated that in prioritizing transmission of the images to the monitor(s) 54 for observation by the operator(s) 56, the images actually displayed on a given monitor 54 may be altered from the images as received by the image content processor 52. The displayed images may, for example, be fewer in number than the received images, or may be displayed in slow motion. The displayed images may also or alternatively be enhanced in contrast, or color, or in some other manner.

The presence of image content processor 52 does not necessarily preclude the use of local image content processing at one or more of the remote sites. It may even be the case that the most advantageous systems involve both centralized and remote image content processing. Nevertheless, systems using centralized image content processing offer several advantages over systems using either no image content processing, or systems using exclusively remote image content processing. Among other things, for example, systems using centralized image content processing can more readily prioritize the presentation of images to the operators 56, and can more readily and cost effectively take advantage of improvements in processing techniques.

The image content processor 52 is thus considered herein to process content of camera images to prioritize transmission of at least some of the images to a monitor for observation. This statement covers embodiments in which the content processing, prioritizing, and transmitting functions occur directly within the image content processor 52, and also such embodiments in which such functions occur in fully or partially independent processors. Thus, the image content processing, prioritizing and transmitting functions may be performed within a single, high speed computer, or in separate computers that are linked together by coaxial cables, or by any other type of communication link(s).

It should thus be appreciated that methods and systems contemplated herein may have significant advantages over other systems, especially with respect to cost effective monitoring of residences. What constitutes cost effective monitoring will necessarily vary with circumstances, including the density of residences. Thus, apartment buildings may require fewer cameras per household than a large estate, and may have a different cost-effectiveness threshold. Cost effectiveness will also vary according to the likelihood of intrusion, and the perceived cost of an intrusion. For example, a relatively high crime area will likely justify a greater expense than a relatively low crime area, and a residence having expensive jewelry or other valuables may justify a greater expense than a residence having few valuables. Still further, a residence having only one or two older or disabled residents, or one that is empty for long periods of time, may justify a greater expense than a residence usually occupied by several young adults.

Such cost effectiveness can be estimated in many ways. From a price standpoint, it is contemplated that security systems described herein may realistically have a cost structure that achieves profitability with an average charge of $100 per residence per month, or preferably $75 per residence per month, or even more preferably $50 per residence per month, or less, each in Jan. 1, 1998 dollars. From an operator standpoint, it is contemplated that security systems described herein can realistically permit sustained monitoring of residential sites at a density of more than 75 cameras per operator, with preferred embodiments permitting monitoring of more than 125 cameras per operator, and still more preferred embodiments permitting monitoring of more than 150 cameras per operator, and most preferred embodiments permitting monitoring of more than 250 or even 500 cameras per operator.

Some embodiments may incorporate additional equipment that allows residents to have at least partial control of the views available to the operator. Thus, a resident intending to be active in his back yard might signal to the operator that a particular camera should be deactivated, or that the images it produced should be filtered out from the stream of images being shown to the operator. Such dynamic adjustment capability and the resulting decrease in the number of images viewed by the operator is expected to contribute to increasing the number of residences that can effectively be monitored. In addition, responsibility for minimizing the number of "false alarms" an operator sees could then be shifted to some extent onto the resident. Some benefit may also be obtained by allowing control by any resident to be exercisable by way of a wireless remote carried by the resident, which could transmit resident access codes. Moreover, the use of resident access codes may provide a benefit towards identifying residents, and limiting control to authorized users.

In a similar fashion, the operator may be provided with the capability of adjusting the filtering parameters in order to decrease the number, frequency or priority of images he is being shown. Such adjustments might include filtering all the images from a particular camera for a fixed period of time or until activity level drop below a specified amount; or adjusting parameters so that filtering for a particular camera becomes more sensitive or less sensitive. An operator may also choose to have utilize some of the monitors 54 only for high priority images.

Other embodiments are contemplated to identify individuals and pets so that their activity gets filtered out.

Identification may be based solely on image data, or may advantageously be accomplished through the use of additional sensors and/or signaling means.

Still other contemplated embodiments may advantageously provide resident access to the image sequences obtained from at least some of the cameras, and/or the ability to talk to the operator over some of the speakers. As an example, a resident may be able to watch either filtered or unfiltered sequences obtained from the cameras located at or near his residence, and also be able to utilize the loudspeakers near his residence to discourage intrusion by other persons or animals. One benefit of such capability is that an intruder may be more readily detected and deterred by having both the resident and the operator monitor the image sequences obtained. Resident monitoring might take place within the residence or at some remote location.

Thus, specific embodiments and applications of methods for monitoring residences and deterring intruders have been disclosed. It should be apparent, however, to those skilled in the art that many more modifications besides those already described are possible without departing from the inventive concepts herein.

What is claimed is:

1. A multi-residence security system comprising:
   a plurality of cameras distributed among remote sites and producing pictorial images;
   a central monitoring facility having an image content processor and a monitor, the image content processor analyzing content of the images to prioritize transmission of at least some of the images to the monitor for observation by at least one human operator, wherein the analyzing involves at least some filtering of video images based on image content; and
   a plurality of remote speakers producing auditory information at the remote sites under at least partial control of the at least one operator.

2. The security system of claim 1 wherein the plurality of cameras averages at least 75 for each of the at least one operators.

3. The security system of claim 1 wherein the plurality of cameras averages at least 125 for each of the at least one operators.

4. The security system of claim 1 wherein the plurality of cameras averages at least 150 for each of the at least one operators.

5. The security system of claim 1 further having a cost structure that achieves profitability with an average charge of $100 to each of the remote sites per month, in Jan. 1, 1998 dollars.

6. The security system of claim 1 further having a cost structure that achieves profitability with an average charge of $75 to each of the remote sites per month, in Jan. 1, 1998 dollars.

7. The security system of claim 1 further having a cost structure that achieves profitability with an average charge of $50 to each of the remote sites per month, in Jan. 1, 1998 dollars.

8. The security system of claim 1 wherein the at least one operator dynamically affects the prioritizing.

9. The security system of claim 1 wherein at least one of the remote sites has a resident, and the resident employs a wireless remote to dynamically affects the prioritizing.

10. The security system of claim 1 wherein the at least one operator speaks through at least one of the remote speakers.

11. The security system of claim 1 wherein at least one of the pictorial images reaches the image content processor via a dial-up telephone line.

12. The security system of claim 1 wherein at least one of the pictorial images reaches the image content processor via a dedicated telephone line.

13. The security system of claim 1 wherein the plurality of cameras averages at least 75 for each of the at least one operators over a one week period, and further having a cost structure that achieves profitability with an average charge of $100 to each of the remote sites per month, in Jan. 1, 1998 dollars.

14. The security system of claim 1 wherein the at least one operator dynamically affects the prioritizing, and operator speaks through at least one of the remote speakers.

15. The security system of claim 1 wherein the plurality of cameras averages at least 75 for each of the at least one operators over a one week period, and wherein at least one of the pictorial images reaches the image content processor via at least one of a dial-up telephone line and a dedicated telephone line.

* * * * *